United States Patent [19]

Parker

[11] Patent Number: 4,468,507

[45] Date of Patent: Aug. 28, 1984

[54] METHOD OF LIMITING RATE OF HEAT EVOLUTION DURING ACID-CATALYZED PHENOL/POLYMETHYLOLPHENOL CONDENSATIONS

[75] Inventor: Theodore L. Parker, Lafayette, Calif.

[73] Assignee: The Dow Chemical Company, Midland, Mich.

[21] Appl. No.: 553,718

[22] Filed: Nov. 21, 1983

[51] Int. Cl.$^3$ .................... C08L 61/12; C08L 61/14; C08G 8/20; C08G 8/24
[52] U.S. Cl. .................... 525/491; 525/480; 525/481; 525/503; 525/507; 528/150; 528/151; 528/153; 528/154; 528/155; 528/165
[58] Field of Search ............. 528/150, 151, 153, 154, 528/155, 165; 525/480, 481, 491, 503, 507

[56] References Cited

U.S. PATENT DOCUMENTS

| | | | |
|---|---|---|---|
| 2,609,352 | 9/1952 | Kvalnes | 528/165 X |
| 2,859,204 | 11/1958 | Florentine et al. | 525/491 |
| 3,062,783 | 11/1962 | Gray et al. | 528/155 X |
| 4,079,113 | 3/1978 | Kimura et al. | 525/503 X |
| 4,112,160 | 9/1978 | Kako et al. | 528/153 X |
| 4,256,844 | 3/1981 | Martin et al. | 528/507 X |
| 4,342,852 | 8/1982 | Takeda et al. | 525/481 |
| 4,345,054 | 8/1982 | Takeda et al. | 525/480 |

*Primary Examiner*—Howard E. Schain

[57] ABSTRACT

Large-scale preparation of branched novolacs by the acid catalyzed, exothermic condensation of methylol-reactive phenols with polymethylol diphenols is made practical by first carrying out the reaction on a scale which permits temperature control simply by cooling and then separately adding more of the premixed reactants and the catalyst at rates such that the temperature of the reaction mixture can readily be controlled.

20 Claims, No Drawings

4,468,507

METHOD OF LIMITING RATE OF HEAT EVOLUTION DURING ACID-CATALYZED PHENOL/POLYMETHYLOLPHENOL CONDENSATIONS

RELATED APPLICATIONS

Co-pending U.S. patent applications, Ser. Nos. 538,034 and 538,033, are respectively directed to (1) branched novolacs prepared by the acid-catalyzed condensation of methylol-reactive phenols with tri- or tetramethylol diphenols, and (2) the epoxides (polyglycidyl ethers) of the novolacs.

BACKGROUND OF THE INVENTION

In order to obtain the novolacs above-referred to with minimal contents of oligomeric molecules it is necessary not only to employ an excess of the methylol-reactive phenol but also to hold down the reaction temperature. The methylol groups are reactive not only with phenol ring hydrogens (the desired reaction for purposes of this application) but also with each other—which results in oligomerization. Unfortunately, the acids which catalyze the desired reaction tend to more effectively catalyze the undesired reaction as the temperature goes up.

Once initiated, the desired condensation is exothermic. On a small reaction scale, the evolved heat can be removed rapidly enough by heat transfer so that the reaction temperature can be held down. However, this is not feasible on a large scale (due to the viscosity of the reaction mixture and its relatively low thermal conductivity). This is largely true even if—in addition to heat exchange with a coolant—removal of heat is accomplished by boil-off of the water (and methanol) formed in the desired (and undesired) reactions.

The reaction of course can be moderated with a solvent, which may also improve sensible heat transfer by thinning the reaction mixture. However, this results in a lower average reaction rate, reduces the efficiency of reactor volume utilization, requires the use of more catalyst and necessitates subsequent removal of the solvent.

It was found that the rate of heat evolution could be reduced by incremental addition of a preformed mixture, of part of the methylol-reactive phenols with all of the polymethylol diphenol, to a mixture of the rest of the phenol and the catalyst, at the desired reaction temperature. However, even this resulted in an undesirably high content of oligomers in the novolac product. Apparently, the rate of self-reaction of methylol groups is much faster than the rate of mixing which can be achieved economically.

OBJECTS OF THE INVENTION

The primary object of the invention is to maximize the content of monomeric molecules which can be attained in a branched novolac produced on a plant scale at a given methylol-reactive phenol to polymethylol diphenol mole ratio.

Another object is to provide a simple, economic method of controlling the rate of heat evolution during large-scale preparations of branched novolacs by the condensation of methylol-reactive phenols with polymethylol diphenols.

A further object is to make it practical to prepare such novolacs on a commercial scale.

An additional object is to obtain the maximum benefit, as to novolac monomer content, from the use of an excess of the methylol-reactive phenol, in large-scale novolac preparations.

It is also an object to reduce the excess of the phenol which must be used in order to obtain a certain minimum content of monomeric molecules in novolacs prepared on a commercial scale.

Yet another object is to provide an economic method of manufacturing a branched novolac of low enough molecular weight to yield a liquid epoxide when reacted with an epihalohydrin and a base.

Corollary objects are to minimize side reactions and to drastically reduce the likelihood of runaway exotherms occurring.

Still other objects will be made apparent to those knowledgeable in the art by the following specifications and claims.

SUMMARY OF THE INVENTION

It has now been found that the foregoing objects can be attained by first reacting the methylol-reactive phenol and the polymethylol diphenol in the presence of an acid catalyst, on a scale which permits temperature control simply by heat removal, and then separately adding more of the premixed reactants and of the catalyst, at rates such that the temperature of the reaction mixture can readily be controlled.

The invention may more formally be defined as an improvement in the process of preparing a branched novolac by the acid-catalyzed, exothermic condensation of a first methylol-reactive phenol with a first tri- or tetramethylol diphenol, wherein the amount of heat liberated and the viscosity of the mixture is such that adequate cooling becomes difficult when the condensation is carried out on a large scale, said improvement comprising:

(1) providing a condensation mixture formed by
  (a) mixing a second methylol-reactive phenol and a second tri- or tetramethylol diphenol, in a mole ratio and in a total amount such that when the latter phenols are reacted in admixture with an acidic condensation catalyst the temperature of the catalyst-containing mixture can readily be kept below a pre-selected level, said second phenol being the same as or different from said first phenol and said second diphenol being the same as or different from said first diphenol;
  (b) mixing the resultant mixture of said second phenols with enough of an acid catalyst so that they will react as a satisfactory rate at said temperature,
  (c) stirring the latter mixture and warming it as may be necessary to initiate condensation and allowing the reaction to proceed for a pre-selected period of time while cooling or heating as necessary to keep the temperature of the reaction mixture within a preselected range below said level;
(2) bringing said condensation mixture to a temperature in said preselected range, stirring it and
  (d) incrementally or continuously adding to the stirring mixture a preformed mixture of said first phenols and, separately, an acidic catalyst for the condensation thereof, and cooling or heating as necessary to maintain the reaction temperature within said range,
  the composition of said preformed mixture, the stirring rate and the rates of said additions being such that the reaction temperature can readily be kept in said range by transfer of heat to or from the reaction mixture; and (e) terminating said additions when the reaction mixture has attained a preselected volume or weight and thereafter maintaining the temperature of the mixture within a preselected range for an end period of preselected duration.

Preferably, the initial condensation mixture is provided by carrying out step (1) of the foregoing definition in-situ, i.e., in the same vessel in which step (2) is carried out.

The method of novolac preparation on which the present invention improves may be alternatively defined as the method of preparing novolac resins which comprises reacting a difunctional phenol, which is ring-substituted with a total of three or four methylol groups, with at least one molecule of a methylol-reactive phenol for each of said methylol groups, in the presence of an acidic catalyst for the reaction of reactive ring hydrogens in molecules of the latter phenol with said methylol groups.

Definitions of Terms

As used above, "difunctional phenol" includes both dinuclear diphenols ("bisphenols") and mononuclear diphenols (simply "diphenols" hereinafter).

The term "methylol-reactive phenol" is used herein to denote a mono- or dihydric phenol having at least one ring hydrogen capable of condensing with a methylol group—attached directly to a hydroxy-substituted benzene ring—to eliminate a molecule of water and to convert the methylol groups to mono- or dihydroxybenzyl groups.

A typical novolac produced by the present method is derived from tetramethylol bisphenol A and ordinary phenol. When prepared at phenol to methylol ratios of about 5 or more, it can be represented by the following formula:

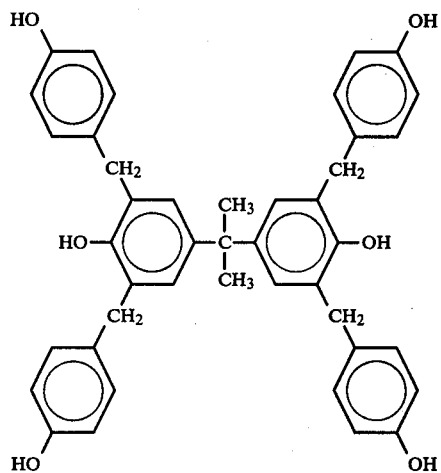

(1)

The most preferred way of utilizing the present process invention is in a "one-pot" process which includes, as a prior step, in situ preparation of the polymethyloldiphenol, by whatever method, as a precursor to the novolac.

It will be seen that the latter novolac has a branched, rather than a linear structure and will provide a closely knit structure when epoxidized and cured. It is representative of the most preferred class of novolacs made by the present process, i.e., those derived from phenol itself and from p,p' bisphenols substituted with a methylol group in each of the four ortho positions therein.

DETAILED DESCRIPTION OF THE INVENTION

Suitable polymethylol diphenols for use in the method of the present invention are bis- or diphenols ring-substituted with at least 3—preferably 4—methylol groups. Otherwise unsubstituted phenols, such as tetramethylol hydroquinone or tetramethylol bisphenols of the formula

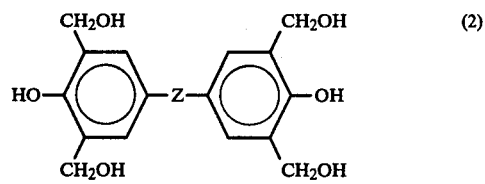

(2)

wherein —Z— is a valance bond, a $C_1$–$C_4$ alkylene or alkenylene group or a $=C(CF_3)_2$, —CO—, —O—, —S—, —SO— or —$SO_2$— group,
are most preferred. However, bisphenols having four active hydrogens can be prepared from meta-substituted phenols—such as m-cresol, for example—and, at least as the p,p' isomers, can be converted to the tetramethylol derivatives.

It is generally preferred that the bisphenol employed consists 100% of the p,p' isomer ("para Bis A", for example). However, the presence of minor amounts of the o,p' isomer (as in "ER Bis A"—97% p,p' and 3% o,p'—for example) is not necessarily detrimental. In fact, assuming that all three active hydrogens in the o,p' isomers can be replaced by methylol groups, the latter isomers may be preferred for the preparation of trimethylol bisphenols.

For the purposes of the present invention, the polymethylol compound preparations are generally carried out by allowing from about 30 to 120 minutes for formation of a bis-phenate slurry (from the bisphenol and an aqueous base) and then reacting it for about 2 to 4 hours with a 5–10% excess of a formaldehyde source material at temperatures within the range of from about 50°–70° C. (60° C., preferably).

It should be noted that pure trimethylol bisphenols may be somewhat difficult to prepare simply by the standard base-catalyzed reaction of the unsubstituted diphenols or p,p'-bisphenols with an excess of formaldehyde. That is, they may be obtained only in admixture with di- and/or tetramethylol derivatives. The content of the trimethylol compounds in such mixtures may be increased by using little or no excess of formaldehyde, employing bases which are less effective catalysts than NaOH and by terminating the reaction short of completion. (As a general proposition, this will be done only when a novolac having an average functionality of less than 6 is desired.)

When the presence of one non-methylol group in a trimethylol diphenol is tolerable or desirable, the trimethylol derivative can more readily be prepared (so long as said group does not interfere, i.e., does not excessively deactivate the ring hydrogens expected to react with the formaldehyde).

That is, unsymmetrical bisphenols having the single substituent in a position ortho (or para) to one of the two phenol groups may be reacted with an excess of formaldehyde under somewhat more severe conditions than those used for the preparation of tetramethylol derivatives of unsubstituted bisphenols. (The requisite monosubstituted bisphenol starting material may be prepared either by direct substitution in the bisphenol or by reacting an aldehyde or ketone with a mixture of substituted and unsubstituted phenols in proportions appropriate to their relative reactivities, and then isolating the desired monosubstituted bisphenol, as by preparative chromatography.)

If the diphenol is resorcinol, one of the ring hydrogens will be meta to both hydroxyls and should be substantially less reactive than the other three ring hydrogens. Thus, with care, the trimethylol derivative should be directly preparable. However, in both catechol and quinol (hydroquinone) all four ring hydrogens are reactive and monosubstitution with a non-interfering group is advisable if a trimethylol derivative of either of these diphenols is desired. Exemplary of substituent groups known or believed to be essentially non-interfering are $C_1$-$C_{20}$ alkoxy or alkenyloxy, $C_1$-$C_{20}$ alkyl, alkenyl, cycloalkyl or cycloalkenyl groups, and phenyl, benzyl, halo and nitro groups.

It is well within the skill of the art to determine whether any particular substituent in a given position with respect to the phenolic hydroxy(s) will prevent the introduction of at least three methyol groups in a given diphenol. Some guidance in this respect will be found in *ACS Monograph* (No. 98): Formaldehyde J. F. Walker. Reinhold Pub. Corp., N.Y. (1944), Ch. 10, pp. 167–172. Reference may also be had to the numerous texts on organic chemistry which include discussions of the influences of various substituents on the chemistry of phenols, benzyl alcohol, etc.

Reference may also be had to U.S. Pat. No. 4,256,844 and to the patents cited therein.

It is likewise well within the skill of the art to determine whether or not a given mono- or dihydric phenol is methylol-reactive. This does not necessarily require testing the phenol with the polymethylol (etc.) difunctional phenol to be used. If the candidate phenol will condense—for example—with the methylol group(s) in saligenin (o-hydroxybenzyl alcohol), 2,4- or 2,6-dimethylol phenol or 2,4,6-trimethylolphenol, it should be suitable as a "methylol reactive phenol" for the practice of the present invention. Other methylol-substituted monophenols which may be more representative of particular polymethylol diphenols are monomethylol xylenols, the 2,6-dimethylol derivative of p-benzylphenol and the dimethylol derivatives of o-chlorophenol and 2-nitro-4-methylolphenol.

Representative tetramethylol diphenols are tetramethylol bisphenol A and tetramethylol hydroquinone. By reaction with a several fold excess of phenol or a dihydroxy benzene, the latter tetramethylol compound may be converted to novolacs having the following formula:

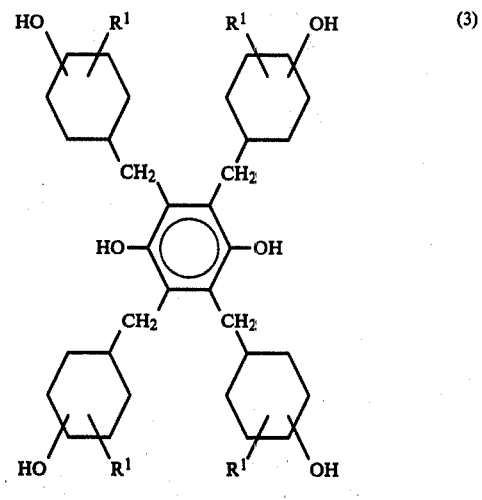

wherein $R^1$ is H or p—OH (the same in each occurrence, unless a mixture of mono- and dihydricphenols is used).

It will be seen that novolacs of the latter formula are not only branched but are even more compact than those of formula (1). If $R^1$ is —OH in each occurrence, the novolac has a phenolic hydroxyl functionality of 10.

If the methylol-reactive phenol used is a substituted monophenol, such as, for example, a cresol, guiacol or anole (phenol substituted in the para position with —CH=CH—CH$_3$), the novolac has the ideal structure shown in formula (3), except that $R^1$ is CH$_3$, o—CH$_3$O— or p(—C=CH—CH$_3$), etc., respectively. The presence of the substituent in a position ortho to a phenolic hydroxyl is preferred.

Those knowledgeable in the art will recognize that novolacs of either of formulas (1) or (3) should be amenable to ring-substitution with halo- or nitro groups (either of which should increase the reactivities of the phenolic hydroxyl groups). This would also be true of novolacs like those of formulas (1) or (3) but derived from mono- or dihydric phenols monosubstituted with alkyl, alkenyl, alkoxy groups, etc.

As indicated earlier herein, the polymethylol diphenol from which the novolac is derived may be made from a correspondingly substituted difunctional phenol.

Preferred Monomeric Novolac Formula

The novolacs made by the process of the present invention preferably consist at least partially of the monomeric, polynuclear, polyphenols of the formula (4) following, the balance, if any, consisting of oligomeric molecules formed during the preparation of the novolac.

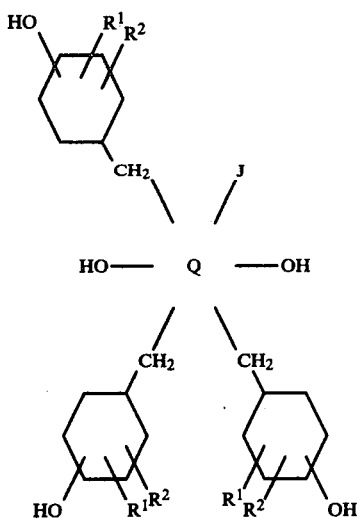

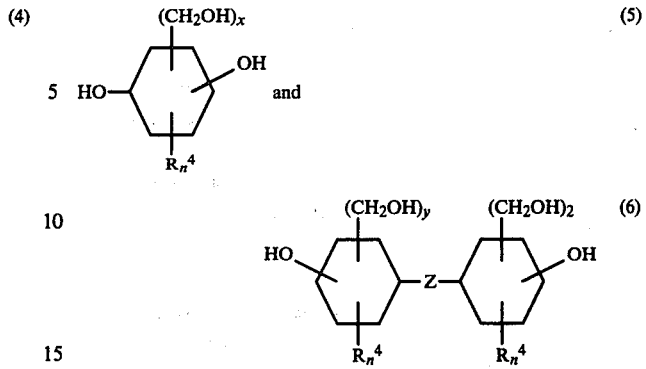

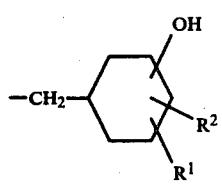

wherein:

$R^1$ is H, a $C_1$-$C_{20}$ alkyl, alkenyl, cycloalkyl, cycloalkenyl, aralkyl, aralkenyl, aryl, alkaryl, alkenylaryl, alkoxy or alkenyloxy group or a halo or nitro group, independently in each occurrence, $R^2$ is H or OH, independently in each occurrence, J is H, an $R^1$ group as above-defined or is a fourth group, and Q is the residue of a polymethylol diphenol of either of the following formulas:

in which $R^4$ is defined as is $R^1$ above, x is 3 or 4, n is 0 or 1, y is 1 or 2, —Z— is a valence bond, a $C_1$-$C_4$ alkylene or alkenylene group, or a =C(CF$_3$)$_2$, —CO—, —O—, —S—, —SO— or —SO$_2$— group.

It is not possible to represent the oligomeric novolacs by a single, ideal formula. It is believed that oligomerization involves reaction of methylol groups with methylol groups in different molecules and reaction of more than one ring hydrogen in a reactive phenol molecule with as many methylol groups in different molecules. (Formation of two —CH$_2$— links between a reactive phenol molecule and a polymethylol diphenol molecule appears possible, but less probable and would not result in oligomerization.) Thus, the oligomeric novolacs are believed to include "abnormal" linkages such as are shown in the following segment hypothesized for a novolac derived from tetramethylol hydroquinone and phenol. (It will be noted that such segments may contain substantially more than ten phenolic hydroxyls.)

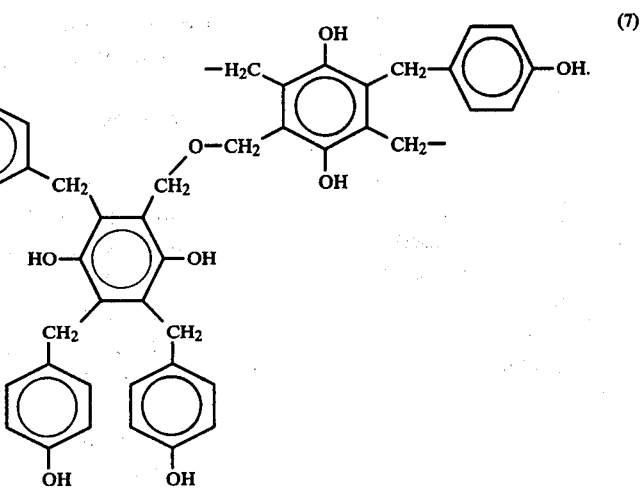

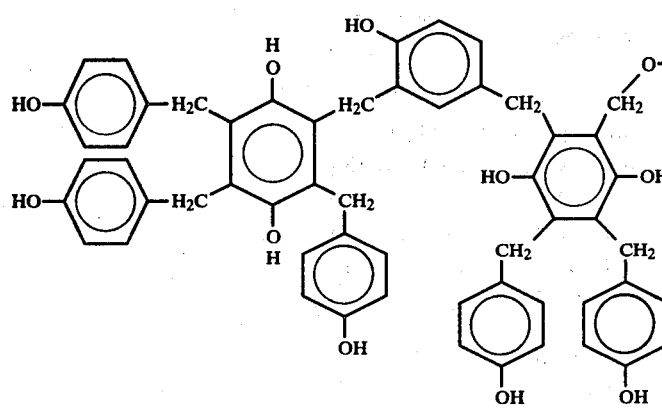

The novolacs may also include some —CH$_2$OCH$_2$— groups formed by intramolecular reactions of adjacent methylol groups on the same aromatic ring. To the extent that this occurs, the phenolic equivalent weight of the novolac may be raised other than by oligomerization. That is, this reaction would result in only a minor molecular weight increase.

Basic (Unimproved) Process

The following disclosure is directed to the unimproved method of novolac preparation, which is suitable on a laboratory scale but is not very practical for plant scale preparations. However, much of the disclosure is discernibly applicable as well to the improved process of the present invention, which is separately discussed subsequently herein.

The methylol-substituted diphenol may be pre-prepared or made in situ. If not immediately utilized, the polymethylol compounds must be stored in a freezer (and even then self-react, albeit slowly).

In one version of the unimproved procedure for novolac preparation, the basic methylolation mixture is carefully neutralized with $CO_2$ (under pressure) or a dilute mineral acid, such as 3 N HCl and is then made just slightly acid (with dilute HCl, for example). The resulting brine layer is separated and a methylol-reactive phenol is mixed with the organic phase before the catalytic acid is added.

It should be noted that the preceding neutralization must be done with an acid which is weak (but stronger than phenol) or is dilute; that is, even moderately concentrated mineral acids strongly catalyze methylol/methylol interaction.

A considerably less "touchy" situation results if the methylol-reactive phenol is mixed with the basic methylolation mixture before it is neutralized. In this case, a strong acid (such as 12 N HCl) can be used for the neutralization. However, this alternative results in the presence of some of the phenol—a pollutant—in the aqueous brine which must be separated and disposed of after the novolac-forming reaction is complete.

Suitable acids for catalysis of the novolac-forming reaction include those, such as oxalic acid, for example, generally used in the preparation of conventional novolacs (from HCHO and phenols). HCl is convenient but acids such as p-toluene sulfonic acid, oxalic acid or acid-form ion exchange resins are also suitable. The amount of acid introduced as the condensation catalyst should be at least enough to lower the pH to about 1.0. Greater amounts of (anhydrous) acids tend to complex the water eliminated in the condensation but are not otherwise beneficial.

The methylol-reactive phenol should be employed in the amount of at least 1 molecular proportion per methylol group to be reacted out. At low ratios (~1–1.5) the novolac produced will generally be predominantly oligomeric and will have a relatively high molecular weight. A high purity monomeric novolac having the ideal structure of formula (4) can be obtained with phenol itself at phenol/—$CH_2OH$ ratios of about 8–10 (mole ratios of about 36:1 to 40:1 for a tetramethylol diphenol). Even higher ratios can be used, but to little or no advantage. "Monomeric" novolacs containing only minor amounts of oligomers can be obtained at ratios of from about 2.0 to 7.5 depending on the relative reactivities of the phenol and the methylol groups, the reaction temperature and the method of combining the reactants.

In general, however, substantial oligomer contents will result at ratios of about 5 or less.

(The novolacs low in oligomers are soft. The predominantly oligomeric novolacs are hard.)

These novolacs having really high contents of oligomeric products generally have higher average molecular weight ranges than are desirable for most uses they would find in the form of their "epoxidized" derivatives. Accordingly, novolacs made at phenol to methylol ratios of at least 2.5 are preferred as epoxy resin precursors. For the latter end use, the novolacs obtained from phenol per se at ratios in the range of about 2 to 3 molecules of phenol per methylol group are more preferred, by reason of providing epoxides (polyglycidyl ethers) of sufficient hardness to be non-sintering, yet low enough in melt viscosity to give good flow properties in molding "compounds". When the phenol is cresol, ratios of about 2.5 to 5.0 are preferred.

Some polymethylol diphenols—such as tetramethylol bisphenol A, for example—tend strongly to crystallize and are most easily utilized when made in situ and mixed with the methylol-reactive phenol immediately after the brine layer has been removed. This is also advantageous in drastically reducing the rate of self-reaction on the part of highly reactive methylol compounds. Further, it is essential to pre-mix the reactants before the catalyst is introduced because self-reaction of the methylol compounds is inherently faster than the desired reaction of methylol groups with ring hydrogens and both reactions are speeded up by the catalyst.

The methylol/phenol reaction may be started by slightly warming the catalyst-containing mixture of reactants but, once under way, is very exothermic. After the rate of reaction drops off, however, the mixture is heated (at reflux, conveniently) for an arbitrary period of from one to several hours, to ensure completion of the reaction.

The reaction mixture should be well stirred (as by means of an impeller or pump or by vigorous refluxing) throughout the reaction, to avoid localized overheating.

*Suitable reaction temperatures* for the novolac-forming condensation extend from the lowest temperature at which adequate stirring and a practical reaction rate can be attained to the highest temperature at which the extent of side-reaction and/or degradation is not intolerable. In general, however, temperatures—including the peak temperature allowed during the exotherm—within the range of from about 40° to about 70° C. are preferred when the methylol-reactive phenol is phenol itself. When the phenol is a cresol, temperatures within the range from about 60° to about 107° C. are preferred.

The reaction mixture may be worked up for the novolac in any suitable manner. A simple and effective workup is to neutralize the acid with 50% aq. NaOH, separate the resulting brine, strip off most of the unconverted methylol-reactive phenol in a rotary evaporator under reduced pressure, complete phenol removal by steam stripping and dry the residual product in a rotary evaporator under reduced pressure—allowing the final pot temperature to reach about 150° C. (At such elevated temperature, the novolac produced can be removed from the vessel—usually with the aid of a hot-air gun—as a viscous but flowable melt.)

The molecular weight of the epoxide can be controlled not only by manipulating reactant ratios (in the novolac and epoxide-forming steps) but also by the choice of the methylol-reactive ("capping") phenol used. That is, "fine tuning" of molecular weight-dependent properties may be achieved by selecting alkyl substituted phenols (ortho-alkyl phenols, preferably) in which the size of the alkyl group is larger or smaller. Also, the proportion of the alkyl phenol in mixtures of the same with ordinary phenol can be varied.

The Improved Process

At the outset, what is meant by the term "improvement" should be made clear. The proportion of higher molecular weight oligomers in the novolac products made on a larger scale by the following method is actually somewhat higher than in the novolacs made on a small scale by the method discussed above. However, when the latter method is scaled up, temperature control by known techniques is difficult at best and the make of higher molecular weight oligomers rises to unacceptable levels. The method of the present invention results in less oligomer growth than scaled up versions of the laboratory procedure in which only conventional techniques of temperature control are utilized. It is in this sense that an improvement has been made with regard to the proportion of higher molecular weight oligomers in the product. A corollary benefit is also realized in the improved process. That is, a higher proportion of the reactants may be introduced at the maximum reaction temperature used. The maximum reaction rate is attained earlier in the operation and the total residence time per "batch" is substantially reduced.

Referring to the more formal definition of the improved process presented earlier herein as part of the Summary of the Invention, step (a) appears to require elaboration in only one regard. In laboratory experiments, it was found that about 1000 grams was the largest amount of a mixture of phenol (~30 g. moles) and tetramethylol bisphenol A (~1 g mol) which should be reacted (in a 5-liter flask) simply by adding c. HCl and warming to initiate the exotherm, letting the temperature peak and then heating to complete the reaction. That is, larger batches required undesirably higher reactant ratios in order to avoid exotherms which threatened to overwhelm the heat removal capacity of the system. Furthermore, excessive oligomer growth was still experienced. Less exothermicity and/or oligomerization may be encountered with other specific phenols and/or polymethylol diphenols but as a general rule, initial batch sizes of about 500 to about 900 grams are advised.

As to step (b), the discussion earlier herein as to the amount of catalyst required applies. However, if any substantial excess of the catalyst is present in the initial reaction mixture after the exotherm has tapered off, addition of more reactant mixture should precede addition of more catalyst.

Neither of steps (c) and (d), as recited in the definition of the present process, requires completion of the initial reaction before the addition of more reactants and catalyst is initiated. If the initial reaction mixture is not to be immediately utilized, i.e., if step (d) is not to immediately follow step (c)—then it is preferred to allow sufficient time for the initial reaction to be essentially completed before heating is discontinued.

It is not necessary for the reactants (or catalyst) added in step (d) to be the same or in the same proportions as those employed in the initial reaction, so long as a mixed novolac product is satisfactory for the end use contemplated. Preferably, however, the same reactants and catalyst in the same proportions, will be used in both stages (1) and (2) for novolac preparation.

EXAMPLES

The following examples are for purposes of illustration and are not to be construed as limiting the present invention in a manner inconsistent with the claims appended to these specifications.

Example 1 following is not an example of the present invention but is an example of the unimproved method of preparing the subject novolacs and is included to illustrate the effect of phenol to methylol ratio, which is essentially the same for the improved process.

EXAMPLE 1

Preparations and epoxidations of novolac from bisphenol A and phenol.

Step 1

100 grams (0.438 gram moles) of bisphenol A flakes were stirred with 200 ml of deionized water in a 500 ml three-neck, round-bottom flask and 70 grams of 50% NaOH (0.875 g moles) was added, resulting in an exotherm to 36° C. and formation of a thick, white slurry. After the slurry had been stirred ½ hour, 146 grams of formalin solution (1.8 g moles HCHO) was added and the slurry then gradually altered to a clear solution. The solution was heated to 40° C. and stirred at that temperature overnight. 1.06% of the formaldehyde remained unconverted.

Step 2

The reaction mixture was transferred to a 2-liter, 3-neck flask and there was added 457 grams of "liquid phenol"—90% phenol, 10% water (4.37 g moles of phenol; ~2.5 moles per —$CH_2OH$). The mixture was neutralized with 72 ml of 12 N HCl and another 28 ml. of the acid was added as a catalyst. The acidified mixture was then refluxed, with stirring, for 1½ hours, neutralized with 50% NaOH and made acid with acetic acid. The resulting brine layer was separated and the organic phase freed of phenol by steam stripping to a final pot temperature of 150° C. The stripped residue weighed 278 grams (97.3% of theoretical for the desired 6-functional novolac) and therefore was presumed to consist essentially of the monomeric novolac of formula (1) herein.

Step 3

When 275 grams (0.4217 g moles) of the novolac were "epoxidized" by treatment with 25.29 g moles (~10 moles per phenolic OH) of epichlorohydrin (see following description of procedure) there was obtained 422 grams (vs 416.5 grams theoretical yield) of a straw-colored, semi-solid resin having an EEW (epoxide equivalent weight) of 178 (vs 164.8, theoretical).

Epoxides of the type made in Run 1 have Mettler softening (dropping) points of about 60°–70° C. and melt viscosities of about 240 centistokes at 150° C. (Brookfield HAT microviscometer).

The epoxidation was carried out by the following procedure. The novolac was stirred in a 2-liter, 3-neck, round-bottom flask with the epi (epichlorohydrin). 2.8 Grams of 60% benzyltrimethylammonium chloride was added as a coupling catalyst to the resulting solution, which was refluxed for one hour and then cooled to 25° C. Dehydrochlorination was done in two steps, the first step being mainly dehydrochlorination of the glycerine dichlorohydrin present after the coupling reaction. 222.6 Grams of 25% aq. NaOH was slowly added to the solution at 25°. Stirring was continued for 30 minutes more and then the epichlorohydrin was stripped out in a rotary evaporator, leaving the salt from the first dehydrochlorination in the resin. The resin was taken up in 100 ml of a 75/25 mixture of MEK (methyl ethyl ketone) and toluene and transferred back to the 2-liter reaction flask, together with a rinse of the evaporator with a little more MEK/toluene. The flask was fitted with a stirrer, thermometer, reflux condenser and dropping funnel. The contents were heated with stirring to 60° C. and addition of another 222.6 gram portion of 25% NaOH commenced. The addition was completed over a period of one hour while holding the temperature at about 60°. After stirring was continued at the latter temperature for another hour, 200 ml more of 75/25 MEK/toluene and 100 ml of deionized water were added. A brine separated cleanly and readily and was removed. The resin solution was dried with anhyd. MgSO$_4$ (but could have been dried by azeotroping out the water) and was filtered. The solvent was stripped off (again, in a rotary evaporator) to leave the resinous epoxide (nominally, the hexaglycidyl ether of the novolac).

The effects on epoxide properties of certain parameters of the present process are significant to the novolac utility presently of greatest interest. (These effects are of course in addition to the usual effects of the variables in the epoxidation step itself.)

The following Table I is a compilation of data for twelve, 3-step epoxide preparations (Runs 2–13)—starting from bisphenol A and using phenol to cap the tetramethylol compound. The preparations were carried out essentially in the manner of the preceding example but at various phenol to methylol ratios and epi to novolac ratios. Also, two different methods of achieving coupling and dehydrochlorination were used in carrying out the epoxidations, as indicated in the Table.

It will be seen from the Table that small differences in the phenol to methylol ratio (as between Runs 8 and 12—which were otherwise essentially identical) can make a considerable difference in the melt viscosity of the epoxides derived from the resulting novolacs. It will also be seen that the stoichiometries employed in Run 13 (phenol/—CH$_2$OH ratio=2.5 and epi/phenolic —OH ratio=5) gave a melt viscosity of 630 centistokes, which is just about right for molding applications.

An indication of the relative effects on EEW of low phenol to methylol ratios and low epi to phenolic OH ratios is apparent from a comparison of Runs 3, 10, 11 and 13.

exotherm in large scale operations. The following "continuous addition" method affords more positive temperature control and is therefore preferred for larger scale preparations, even though it results in a somewhat higher proportion of higher molecular weight oligomers in the novolac product. (More conventional methods of limiting heat evolution resulted in substantially higher molecular weights.)

A.

A solution of 340 grams (0.98 mole) of preformed tetramethylol bisphenol A (which had been kept in a freezer) and 2756 grams of phenol (29.3 moles; 7.5 molecules per methylol group) was made up. 900 Grams of this solution and 25 ml of c. HCl were stirred together in a 5-liter, round-bottom, 3-neck flask and heated. When the solution reached a temperature of 40° C., an exotherm to 75° occurred. Heating was continued and the temperature brought to and maintained thereafter in the range of 105±5° C. After 15 minutes at that temperature, anhydrous HCl gas was introduced to saturation. The balance of the tetramethylol bis A/phenol solution was then added in 500 ml aliquots at an average rate of about 25 ml per minute, the reaction mixture being resaturated with HCl after each aliquot had been added. After the final addition, the temperature was held at 105° C. for 90 minutes. The acid and water remaining in the mixture and the unconverted phenol were removed by stripping in a roto-evaporator under reduced pressure, followed by steam stripping of the residue.

Analysis of the novolac product by GPC (gel permeation chromatography) showed that it consisted of about 85% of monomer and about 15% of somewhat higher molecular weight species. The equivalent weight of the novolac (grams per phenolic hydroxyl) was 151 (versus about 110 for the ideal, 6 functional novolac of formula (1) herein.

B.

The novolac was "epoxidized" in the following manner. 69.6 Grams of the novolac is dissolved in 546 grams

TABLE I

| | PREPARATIONS OF NOMINALLY SIX-FUNCTIONAL NOVOLAC EPOXIDES | | | | | | | |
|---|---|---|---|---|---|---|---|---|
| Run No. | Phenol/ Methylol Ratio | Epi to Phenolic OH Ratio | Coupled with | Dehydro-chlorinated with | EEW | Hyd. Cl %[4] | Mettler S.P. of Epoxide | Melt Viscosity 150° C. Cks. |
| 2 | 2.5/1 | 10/1 | BTMAC[3] | NaOH/Na$_2$CO$_3$ | 178 | | Soft | |
| 3 | 2.5/1 | 2/1 | " | " | 256 | | | 1393 cks. |
| 4 | 1.5/1 | 10/1 | " | " | 226 | | | |
| 5 | 1.25/1 | 10/1 | " | " | 219 | 2.24 | 90.9° | |
| 6 | 1.5/1 | 10/1 | " | 25% NaOH in MEK—toluene | 216 | 0.08 | 87° | |
| 7 | 2/1[1] | 10/1 | " | NaOH—MEK—tol. | 214 | 0.16 | 88.2° | 2787 cks. |
| 8 | 2/1[2] | 10/1 | " | " | 214 | 0.11 | 92.5° | 3139 cks. |
| 9 | 5/1 | 10/1 | " | " | 194 | | Soft | |
| 10 | 5/1 | 1.2/1 | NaOH only | " | 294 | | 87.2° | |
| 11 | 5/1 | 1.3/1 | " | " | 294 | | | |
| 12 | 2.5/1 | 10/1 | BTMAC | " | 201 | 0.37 | 66.6° | 241 cks. |
| 13 | 2.5/1 | 5/1 | " | " | 212 | 0.06 | 77.1° | 630 cks. |

Notes:
[1]Mettler softening point of novolac 124.1° C.
[2]Mettler softening point of novolac 114.6° C.
[3]Benzyltrimethylammonium chloride.
[4]Hydrolyzeable chloride in epoxide.

EXAMPLE I

Preparation of phenol/tetramethylol bis A novolacs by method affording better control of exotherms.

The methods of novolac preparation described earlier herein are preferred for small scale preparations but do not permit sufficiently reliable control of the initial of epichlorohydrin (7 mols per phenolic OH) and 0.7 grams of BTMAC coupling-catalyst added. The solution is refluxed 2.5 hours and cooled to ambient temperature. 52 Grams of 25% aq. NaOH is added and the mixture stirred 1 hour at ambient temperature. Water and unconverted "epi" are removed by distillation in vacuo. The residue is dissolved in 70 grams of 75/25 MEK/toluene and heated to 60° C. Another 52 grams of 25% NaOH is then added at 60° C. in one hour and the reaction mixture stirred another hour at 60° C. More MEK/toluene is added in an amount equal to twice the weight of the novolac charged and half that amount of water is added, with stirring. Phase disengagement is permitted and the aqueous phase removed. The organic phase is dried (as with MgSO4), mixed bentonite (20%; to remove BTMAC) and filter-aid, filtered and stripped.

The epoxide (nominally 6-functional, polyglycidyl ether) had an EEW of 179 (vs. 165 theoretical). The HDT values obtained when this epoxide was cured 1:1 with each of two different curing agents are given in Table II following. Also included in the Table, for comparison, are the HDT values obtained with each of four different curing agents for a similar epoxide made essentially by the procedure of Example I but at a phenol/methylol ratio of 7.5 to 1 and epi/phenolic OH ratio of 7 to 1.

C.

A novolac was prepared essentially in the manner of Example IA but employing o-cresol as the methylol-reactive phenol and in a ratio of 5 molecules per methylol group. It was epoxidized in the manner of Example IB but with an epi/OH ratio of 10:1. HDT values of the epoxide, cured 1:1 and 0.7:1 with MDA (methylene dianiline), are included in Table II. Also included, for comparison, is an HDT value for the commercial 6-functional epoxy resin, "ECN-1280" (registered tradename; Ciba-Geigy, Epoxy Cresol Novolac) cured 1:1 with nadic methyl anhydride (NMA)+2% BDMA (benzyl dimethyl amine).

method. It will also be seen that the cresol-derived epoxy novolac, cured with the same curing agent (MDA, 1:1), had a substantially higher HDT than the phenol-derived epoxy novolac, even though the cresol novolac was made by the continuous addition method and at a lower "phenol" to methylol ratio.

OTHER UTILITIES

The novolacs prepared by the method of the present invention are not limited in utility to epoxy resin precursors. They may also be used as antioxidants, intermediates for drugs, dyes and pesticides and as precursors to polyurethanes, polyesters and polycarbonates. They also are self-curing phenolic resins and may be used as phenolic curing agents for epoxides.

More specific end uses contemplated for the novolacs, in the form of epoxies, are: for the lower molecular weight products, in adhesives, laminates and potting compounds; and for the higher molecular weight products, in molding compounds and powder coatings.

The novolacs may of course be employed for various purposes in admixture with mono- or dihydric phenols or with polynuclear polyphenols such as phenol/formaldehyde novolacs, bisphenol/formaldehyde novolacs, or $C_1$–$C_6$ alkanes or alkenes substituted with from two to four hydroxyphenyl groups.

What is claimed is:

1. In the process of preparing a branched novolac by the acid-catalyzed, exothermic condensation of a first methylol-reactive phenol with a first tri- or tetramethylol diphenol, wherein the amount of heat liberated and the viscosity of the mixture is such that adequate cooling becomes difficult when the condensation is carried out on a large scale, the improvement comprising:

(1) providing a condensation mixture formed by (a) mixing a second methylol-reactive phenol and a second tri- or tetramethylol diphenol, in a mole ratio and in a total amount such that when the latter phenols are reacted in admixture with an acidic condensation catalyst the temperature of

TABLE II

| HDT VALUES FOR SIX-FUNCTIONAL NOVOLAC EPOXIDES | | | | | | | |
|---|---|---|---|---|---|---|---|
| NOVOLAC MADE FROM | φOH/ METHYLOL | epi/ Ar—OH | EEW | CURING AGENT | RATIO | CURE SCHEDULE HRS/°C. | HDT-(TMA) |
| Phenol; by method of Ex. 1 | 7.5 | 7 | 179 | NMA+ 2% BDMA | 1:1 | 2/100+ 18/180 | 159° C. |
| " | " | " | " | DADS | 1:1 | 2/100+ 18/180+ 2/200 | 178 |
| " | " | " | " | NMA+ 2+ BDMA | 1:1 | 2/90+ 4/165 | 122 |
| " | " | " | " | MDA | 1:1 | 2/90+ 4/165 | 195 |
| Phenol; by "continuous addition" method (Ex. IA) | 7.5 | 7 | 192 | NMA+ 2% BDMA | 1:1 | 2/100+ 18/180 | 135 |
| | | | | m-PDA | 1:1 | 2/85+ 10/150 | 185 |
| Cresol; by "continuous addition" | 5 | 10 | 249 | MDA | 1:1 | 2/100+ 18/180 | 220 |
| | | | | | 0.7:1 | 18/180 | 200 |
| ECN-1280 (Purchased) | | | 226 | NMA+ 2% BDMA | 1:1 | 2/100+ 18/180 | 194 |

NOTES:
NMA = Nadic Methyl Anhydride
DADS = Diamino Diphenyl Sulfone
BDMA = Benzyl Dimethyl Amine
MDA = Methyl Dianiline
PDA = Phenylene Diamine It will be seen from the data in Table II that the epoxidized novolac made from phenol by the method of Example 1, when formulated with the same amount of the same curing agent (NMA/BDMA), gave a higher HDT than the otherwise comparable, higher EEW epoxy novolac made by the continuous addition the catalyst-containing mixture can readily be kept below a pre-selected level, said second phenol being the same as or different from said first phenol and said second diphenol being the same as or different from said first diphenol;
(b) mixing the resultant mixture of said second phenols with enough of an acid catalyst so that they will react at a satisfactory rate at said temperature,
(c) stirring the latter mixture and warming it as may be necessary to initiate condensation and allowing the reaction to proceed for a preselected period of time while cooling or heating as necessary to keep the temperature of the reaction mixture within a preselected range below said level;
(2) bringing said condensation mixture to a temperature in said preselected range, stirring it and
(d) incrementally or continuously adding to the stirring mixture a preformed mixture of said first phenols and, separately, an acidic catalyst for the condensation thereof, and cooling or heating as necessary to maintain the reaction temperature within said range,
the composition of said preformed mixture, the stirring rate and the rates of said additions being such that the reaction temperature can readily be kept in said range by transfer of heat to or from the reaction mixture; and
(e) terminating said additions when the reaction mixture has attained a preselected volume or weight and thereafter maintaining the temperature of the mixture within a preselected range for an end period of preselected duration.

2. The improved process of claim 1 wherein the mole ratio of the phenol and diphenol in the preformed mixture added in step (d) is the same as in the mixture formed in step (a).

3. The improved process of claim 1 wherein the condensation mixture charged to step d has been prepared in situ as specified in step 1.

4. The improved process of claim 1 wherein the condensation initiated in step (c) has been allowed to go to completion before step (d) is commenced.

5. The improved method of claim 1 in which said first methylol-reactive phenol is a monohydric phenol.

6. The improved method of claim 1 in which said first methylol-reactive phenol is a dihydric phenol.

7. The improved method of claim 1 in which said difunctional phenol is of either of formulas (a) and (b) following:

(a) (CH$_2$OH)$_x$-substituted phenol with OH and R$_n^1$
(b) bis-phenol with (CH$_2$OH)$_y$, Z linker, R$_n^1$, and terminal (CH$_2$OH)$_2$ with OH and R$_n^1$ wherein
R$^1$ is a C$_1$–C$_{20}$ alkyl, alkenyl, cycloalkyl, cycloalkenyl, aralkyl, aralkenyl, aryl, alkaryl, alkenylaryl, alkoxy or alkenyloxy group or a halo or nitro group, independently in each occurrence,
x is 3 or 4, n is 0 or 1, y is 1 or 2, and
—Z— is a valence bond, a C$_1$–C$_4$ alkylene or alkenylene group or a =C(CF$_3$)$_2$, —CO—, —O—, —S—, —SO— or —SO$_2$— group.

8. The improved method of claim 1 in which said reactive phenol is of the formula (c) HO—C$_6$H$_3$(R$^1$)(R$^2$)

wherein
R$^1$ is H, a C$_1$–C$_{20}$ alkyl, alkenyl, cycloalkyl, cycloalkenyl aralkyl, aralkenyl, aryl, alkaryl, alkenylaryl, alkoxy or alkenyloxy group or a halo- or nitro group; and
R$^2$ is H or an OH group.

9. The method of claim 7 in which the methylol-reactive phenol is of the formula (c) HO—C$_6$H$_3$(R$^1$)(R$^2$)

wherein
R$^1$ is H, a C$_1$–C$_{20}$ alkyl, alkenyl, cycloalkyl, cycloalkenyl aralkyl, aralkenyl, aryl, alkaryl, alkenylaryl, alkoxy or alkenyloxy group or a halo- or nitro group; and
R$^2$ is H or an OH group.

10. The method of claim 7 in which said difunctional phenol is tetramethylol bisphenol A.

11. The method of claim 10 in which the methylol-reactive phenol is phenol itself.

12. The method of claim 8 in which said reactive phenol is a cresol.

13. The method of claim 7 in which said difunctional phenol is tetramethylol hydroquinone.

14. The method of claim 7 in which said difunctional phenol either is of formula (a) and x=3 or is of formula (b) and y is 1.

15. The improved method of claim 1 wherein the ratio of the number of moles of said reactive phenol charged to the number of equivalents of methylol groups present in the amount of said diphenol charged to the reaction is within the range of from about 2 to about 10.

16. The method of claim 15 wherein said ratio is within the range of from about 2.0 to about 7.5.

17. The method of claim 15 wherein said ratio is within the range of about 8 to about 10.

18. The method of claim 9 in which the ratio of the number of moles of said reactive phenol charged to the number of equivalents of methylol charged to the reaction is within the range of from about 2.0 to about 7.5.

19. The method of claim 9 in which said ratio is within the range of from about 8 to about 10.

20. The improved method of claim 1 including, as a prior step, preparing said methylol substituted diphenol in situ.

* * * * *

UNITED STATES PATENT AND TRADEMARK OFFICE
CERTIFICATE OF CORRECTION

PATENT NO. : 4,468,507
DATED : August 28, 1984
INVENTOR(S) : Theodore L. Parker

It is certified that error appears in the above—identified patent and that said Letters Patent is hereby corrected as shown below:

Column 1, line 9, after "538,034" insert -- , now abandoned, -- ;

Column 1, line 9, after "538,033" insert -- , now allowed, -- ;

Column 2, line 51, please delete "as" and insert -- at -- ;

Column 4, line 21, "valence" is misspelled;

Column 4, line 24, delete "most" and insert -- more -- ;

Column 5, line 31, "hydroxyl(s)" is misspelled;

Column 6, the formula should have circles drawn in the rings as the center one has;

UNITED STATES PATENT AND TRADEMARK OFFICE
CERTIFICATE OF CORRECTION

PATENT NO. : 4,468,507
DATED : August 28, 1984
INVENTOR(S) : Theodore L. Parker

Page 2 of 3

It is certified that error appears in the above—identified patent and that said Letters Patent is hereby corrected as shown below:

Column 7, the first formula at lines 1-20 should be drawn as follows:

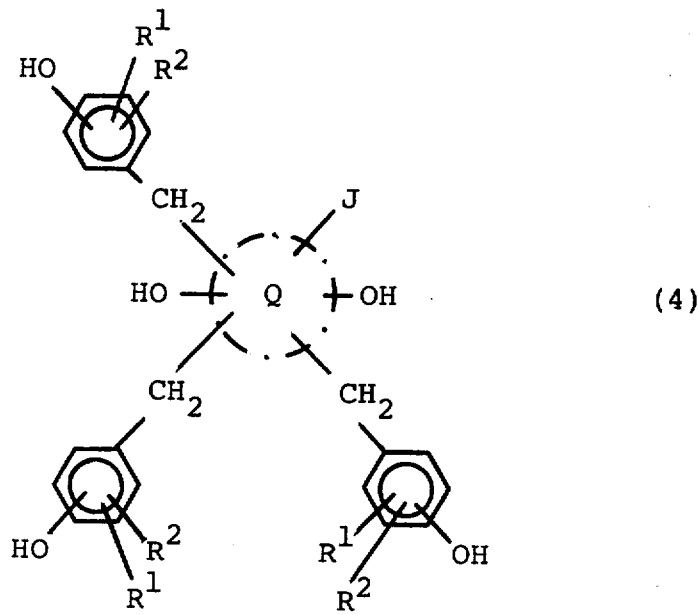

UNITED STATES PATENT AND TRADEMARK OFFICE
CERTIFICATE OF CORRECTION

PATENT NO. : 4,468,507

DATED : August 28, 1984

INVENTOR(S) : Theodore L. Parker

It is certified that error appears in the above—identified patent and that said Letters Patent is hereby corrected as shown below:

Column 7, the second formula at lines 31-37, and the formulas at column 8, lines 1-15, should have circles drawn in the rings;

Column 9, line 61, delete "These" and insert -- Those --;

Column 15, the Notes in Table II, the description for MDA is -- Methylene Dianiline" --.

Signed and Sealed this

Twelfth Day of November 1985

[SEAL]

Attest:

Attesting Officer

DONALD J. QUIGG

Commissioner of Patents and Trademarks